June 21, 1927. 1,632,976

P. A. KOURTZMAN

SPEED INDICATING APPARATUS

Filed Nov. 19, 1925  2 Sheets-Sheet 1

Inventor,
Per Andersson Kourtzman,
By Henry Ooth Jr.
Atty.

June 21, 1927.
P. A. KOURTZMAN
1,632,976
SPEED INDICATING APPARATUS
Filed Nov. 19, 1925
2 Sheets-Sheet 2
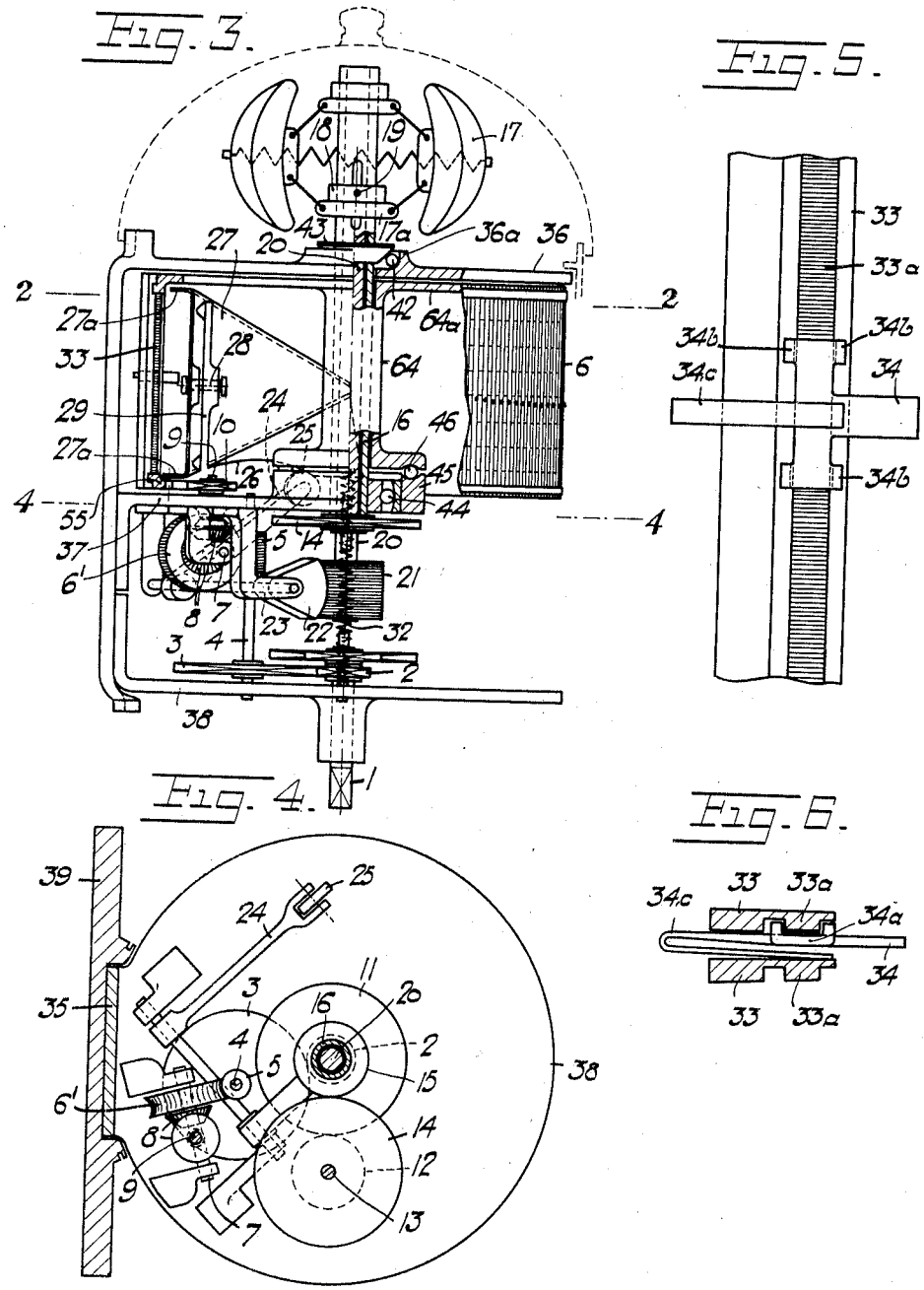

Patented June 21, 1927.

1,632,976

UNITED STATES PATENT OFFICE.

PER ANDERSSON KOURTZMAN, OF VARTAN, NEAR STOCKHOLM, SWEDEN.

SPEED-INDICATING APPARATUS.

Application filed November 19, 1925, Serial No. 70,098, and in Sweden November 19, 1924.

The present invention relates to speed indicating apparatus for motor vehicles, in which a series of pins under the control of a member adjusting itself in accordance with the speed of the vehicle are adjusted in relation to a graduation into positions corresponding to the momentary speed of the vehicle.

Figure 1:
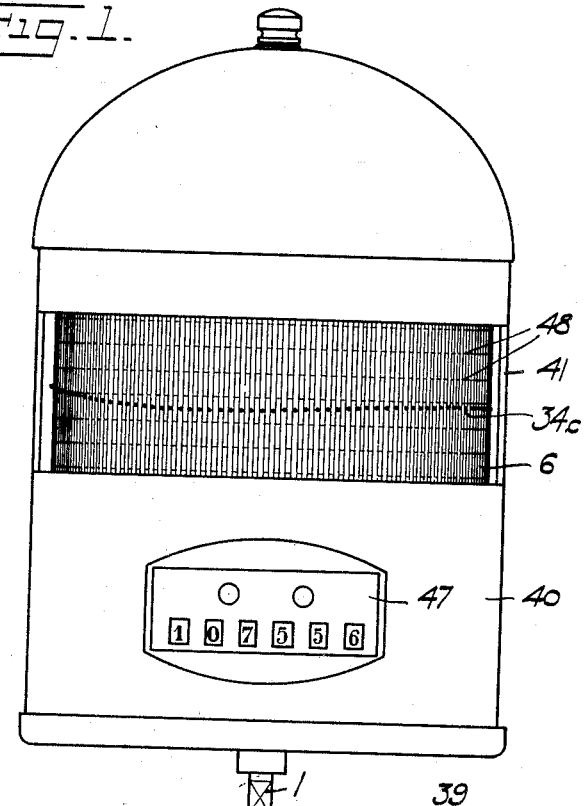
Figure 2:
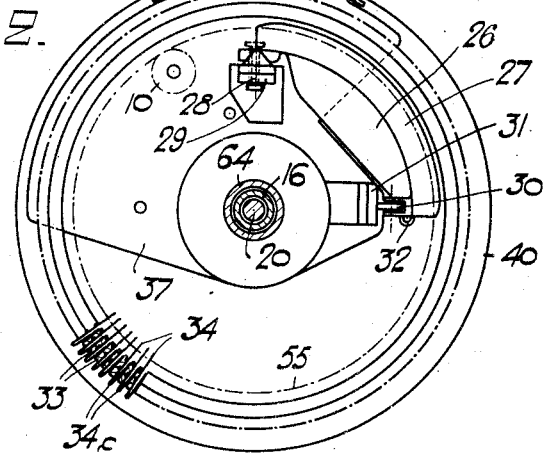

The object of the invention is to provide a device whereby the said pins will in a reliable manner be kept in their positions so that they will not move therefrom on account of the shakings of the vehicle at the same time as they will offer a minimum of resistance against adjustment. For this purpose the pins or the like are provided in slots which are formed between parallel, graduated lamellæ and the one side of which is formed with a transverse serration in which a corresponding serration on the pins is engaging under the influence of a spring, all as will be more particularly described herebelow with reference to the accompanying drawings in which Fig. 1 shows a speed indicating apparatus in front elevation, Fig. 2 a horizontal section on line 2—2 in Fig. 3, Fig. 3 a side elevation of the apparatus, the casing being removed and some parts being shown partially in section or partially removed, Fig. 4 a horizontal section on line 4—4 in Fig. 3, Fig. 5 a detail view of a lamel and a pin, and Fig. 6 a cross section through two adjacent lamellæ and in plan view a pin therebetween.

The apparatus is provided at its bottom with an axle 1 which in well known manner is adapted to be connected to the wheels or the driving shaft of a vehicle so that it will be rotated with a speed proportional to the speed of the vehicle. The movement of said axle 1 is transmitted by means of toothed wheels 2 and 3, an axle 4, a worm 5, a screw wheel 6', an axle 7, two bevel wheels 8, an axle 9 and a toothed wheel 10 to a toothed ring 55. The movement of the axle 1 at the same time is transmitted by means of toothed wheels 11 and 12, an axle 13, a portion of which is broken away in Fig. 4, toothed wheels 14 and 15 and a hollow shaft 16 to a centrifugal governor 17 the up and down movable member 17ª of which is arranged to actuate a ring 18, which by means of a pin 19 is connected to a longitudinally movable axle 20 disposed in said hollow shaft 16 and partaking in the rotating movement of the same. On the lower end of the axle 20 a sleeve 21 is slidably but not rotatably disposed. This sleeve is formed on its circumference with annular teeth engaged by a toothed segment 22 secured to a rotatable axle 23 which supports an arm 24 having at its free end a roller 25 bearing against a curved member 26. The latter is rigidly secured to or integral with a triangular guide member 27 pivotally journalled on an axle 28, secured to a bracket 29. Said guide member has side walls 27ª converging towards the free end of the guide member where they form between themselves a narrow opening. At the free end the guide member 27 supports a roller 30 (Fig. 2) bearing against a vertical guide 31. The curved member 26 is actuated by a spring 32 tending to turn the same and thus the guide member 27 downwards.

A drum or cylinder 6 is composed of a plurality of lamellæ 33 the upper ends of which are secured to a flange 64ª of a hollow axle 64 surrounding the shaft 16, the lower ends of the lamellæ being secured to the toothed ring 55. The lamellæ 33 form between themselves axially extending slots one side of which has a longitudinal, transversely serrated rib 33ª (Fig. 5). In each slot is provided a pin 34 having a serrated portion 34ª engaging said rib. The portion 34ª is provided at its ends with fingers 34ᵇ engaging the sides of the rib 33ª and guiding the pin when the latter is moved up and down in the slot. Each pin 34 is actuated by a spring 34ᶜ which in the construction form illustrated in the drawings is U-shaped and one shank of which is secured to or integral with the pin 34, while its other shank bears against the other non-serrated side surface of the slot between two adjacent lamellæ with a slight pressure. The spring 34ᶜ protrudes from the outer side of the cylinder formed by the lamellæ 33 and serves as an indicating pin.

The various parts of the apparatus are supported by a frame consisting of a vertical plate 35 and three horizontal plates 36, 37 and 38. Said frame is secured to a base plate 39 and surrounded by a casing 40 formed with an opening 41 through which the drum 6 is visible. The horizontal frame plate 36 forms a track 36ª for balls 42 (only one shown in Fig. 3) on which the shaft 16 is journalled by means of a conical flange 43. At the lower end this shaft 16 is journalled by means of a ball bearing 44 in a ring 45 rigidly secured to the horizontal frame plate 37 and formed on its upper side with a track for balls 46 (only one shown in Fig. 3) supporting the axle 64.

The apparatus may in well known manner be provided with an indicator 47 showing the total distance the vehicle has run.

When the apparatus described above is in function on a vehicle the drum or cylinder 6 rotates with a speed that is proportional with the speed of the vehicle, while the centrifugal governor 17 in variations of the speed of the vehicle moves the axle 20 and thereby the sleeve 21 upwards or downwards. The sleeve 21 turns the toothed segment 22 and thereby the curved member 26 and the guide member 27 the narrow end of which thus is kept at a level that corresponds to the momentary speed of the vehicle. When a pin 34 strikes the one or the other of the side walls of the guide member 27 it will at first be pressed towards the free shank of the U-shaped spring 34ᶜ and thereby be disengaged from the serrated rib 33ª whereupon it will be displaced upwards or downwards until it passes through the narrow end of the guide member 27. As soon as this occurs the lateral pressure on the pin 34 ceases on account whereof the pin will immediately be locked on the serrated rib 33ª and remain in its locked position until it again is displaced by the guide member 27. The springs 34ᶜ form on the outer side of the drum 6 a speed indicating diagram as is illustrated in Fig. 1 in which is also shown that the lamellæ forming the drum are provided with graduations 48 corresponding to various speeds of the vehicle.

Having now described my invention what I claim is:

In a speed indicating apparatus of the character described, the combination of a rotatable drum the circumferential wall of which is composed of a plurality of axially extending spaced lamellæ forming between them axially extending slots, one side surface of each slot being serrated transversely, spring actuated pins arranged radially with respect to said drum and movable axially in said slots and formed with a serrated portion engaging the serrated side surface of the slot, means for rotating said drum, and means for displacing said pins axially so as to adjust them into positions corresponding to the momentary speed of a vehicle.

In testimony whereof I have hereunto set my name this 6th day of November, 1925.

PER ANDERSSON KOURTZMAN.